United States Patent Office 3,199,274
Patented Aug. 10, 1965

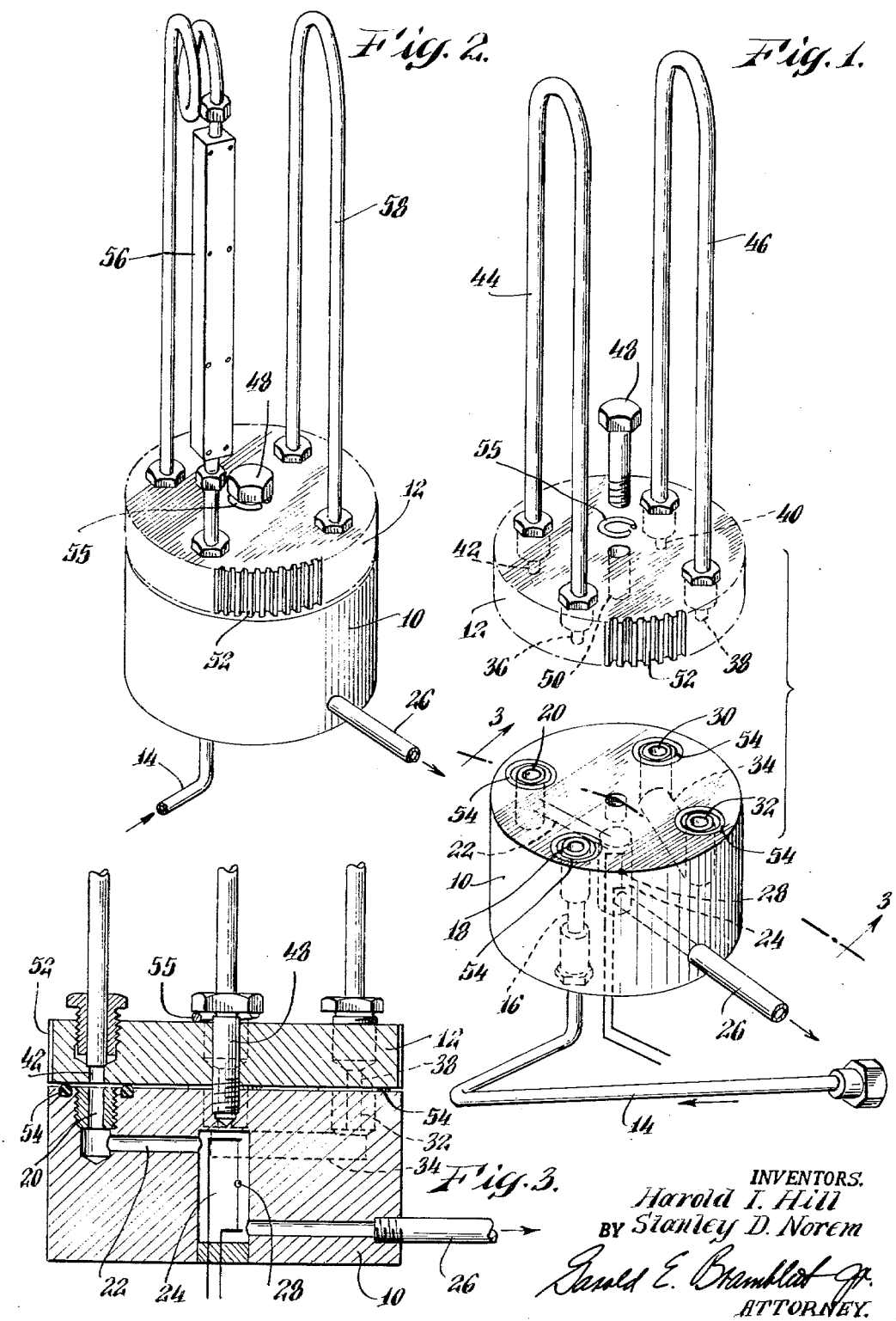

3,199,274
CHROMATOGRAPHY APPARATUS
Stanley D. Norem, Bayside, N.Y., and Harold I. Hill, Fairfield, Conn., assignors to The Perkin-Elmer Corporation, Norwalk, Conn., a corporation of New York
Filed July 26, 1961, Ser. No. 126,959
3 Claims. (Cl. 55—386)

This invention relates to chromatography or vapor fractometer apparatus, and more particularly, to an improved multi-purpose switching apparatus for controlling fluid flow through chromatographic columns or fractometer column. "Vapor fractometry" is defined in substantial detail in U.S. Patent No. 2,757,541 granted to E. S. Watson et al. on August 7, 1956 and assigned to the same assignee as to the present application.

Examples of instruments which analyze fluids by means of chromatography or vapor fractometry comprise essentially one or more separating columns, means for introducing into the columns a vaporous sample included in an inert carrier gas, and means for detecting the columns effluents. The columns may be either of the packed type or of the open tubular type known as Golay columns and disclosed in United States Patent 2,920,478 which issued January 12, 1960 to Marcel J. E. Golay. A packed column consists essentially of a tube containing either an inert packing material such as celite or crushed firebrick supporting a layer of liquid separating agent or a particulated solid adsorption agent. A Golay column comprises a tube which has its walls coated with the separating agent. In either case, as the carrier gas and sample flow through the column, the progress of various sample components is impeded by different amounts so that they emerge as separate mixtures with the carrier. The concentration of each component in the carrier is then measured by a suitable detector. One widely used type of detector is a thermistor for measuring the heat conductivities of the mixtures. The thermistor is customarily included in a suitable bridge circuit and the error signal of the bridge is amplified and passed to a recorder.

For many types of analysis, it is desirable to direct the carrier flow through series-connected columns having different separating agents or to reverse the flow direction in a single column. For example, it may often be desired to back-flush a column when heavier components tend to collect in the entrance of the column. Flow through the column may then be reversed at a suitable time to elute these components from the front of the column thereby reducing the total analysis time. It may also be desirable in some instances to insert other apparatus into the flow path. One such apparatus is a combustor unit which is well known in the art of chromatography or vapor fractometry. Such a device customarily comprises an enclosed heated tube containing a suitable oxidizing agent such as copper oxide. As hydrocarbons pass across the heated oxide, they are converted in a quantitative manner to carbon dioxide and water. For purposes of amplifying the output signal, such a device may be placed on the outlet of a column. This is especially useful for trace analysis. When such a combustor is placed before a column which is capable of separating carbon dioxide and water, quantitative information such as the carbon-hydrogen ratio of a pure sample may be obtained and pure samples may be identified.

In the prior art, it has been necessary to include in a vapor fractometer separate valving means for accomplishing these desired changes in flow path. This has resulted in extra piping lengths to conduct the fluids between the valve apparatus, the columns, and the detector. This causes mixing and consequent deterioration of component separation.

It is, therefore, the primary object of this invention to provide an improved chromatograph or vapor fractometer.

Other objects are to provide such a chromatograph or fractometer which is of simple construction, has a minimum of piping, is compact, and may be utilized in a variety of analytical procedures.

The above objects are attained by means of chromatograph or vapor fractometer apparatus which comprises first and second members which are in abutting, coaxial, relatively rotatable, sliding relationship with one another. The first member defines (1) a plurality of first openings in its abutting surface; (2) an inlet passage connecting with one of the openings; (3) an outlet passage connecting with another opening; and (4) a loop passage interconnecting a third and fourth opening. The second member defines a plurality of openings in its abutting surface which are in selective fluid flow relationship with the openings of the first member. Chromatographic or fractometer separating column means are mounted on the second member in fluid flow relationship with the second openings.

The construction and operation of the apparatus of this invention will be more apparent from the figures of the attached drawing wherein:

FIG. 1 illustrates, in an exploded view, an apparatus constructed in accordance herewith;

FIG. 2 illustrates a similar apparatus having a combustor mounted thereon; and

FIG. 3 is a cross-section taken along 3—3 of FIG. 1.

The apparatus in FIG. 1 comprises a first base member 10 and a rotatable second member 12. Connected to member 10 is a suitable inlet connection 14 for the introduction of the carrier gas and sample to the apparatus. An inlet passage 16 conducts the fluids to an opening 18 in the upper surface of member 10. A second opening 20 is formed in the upper surface of member 10 and connects with a suitable passageway 22 for conducting fluids through a detector chamber 24 and thence to an outlet 26. A suitable detector, such as a thermistor 28, is included in chamber 24. Additional openings 30 and 32 in the upper surface of member 10 are interconnected by means of a loop passage 34. The second member 12 is rotatable upon the upper surface of member 10, and includes four openings 36, 38, 40, and 42, which are aligned with the four openings in the top of member 10. Each of the openings in the upper member is connected to a suitable passageway which terminates in a suitable fitting for the attachment of columns or other apparatus. In the illustration of FIG. 1, a chromatograph or fractometer column 44 is connected to openings 36 and 42 and another column 46 is connected to openings 38 and 40. Suitable alignment and axle means such as axle bolt 48, bore 50, and threaded hole 51 are provided for the rotation of the upper member 12 and its associated columns. The upper member 12 may be rotated relative to the lower member by hand or by any other suitable means such as geared surface 52 and a suitable driving gear (not shown). O-ring 54 encircle each of the openings in the surface of member 10 to provide a vapor seal. If desired, a spring or other suitable compression means such as lock-washer 55 may be inserted between members 10 and 12.

The operation of the disclosed apparatus will be apparent from FIG. 1 wherein it will be seen that carrier gas and sample flow into the unit through connection 14, pass into column 44 by means of opening 36, and out of the column through opening 42. From opening 42, the fluids pass through the detector chamber 24 and out of outlet 26. At the same time, column 46 is out of service, being connected to loop 34. As upper member 12 is rotated 90° clockwise, flow through column 44 will be reversed. The fluid will then enter column 46, pass through loop 34 into column 44, and elute to the detector, thus providing back-flushing of column 44. It is to be understood that column 46 may be either a standard fractometer column or merely an empty tube of any desired length and diameter for provding flow passage between openings 38 and 40. Similarly, back-flushing may be accomplished by performing the analysis with column 44 positioned between openings 20 and 30. A 90° counter clockwise rotation will then provide back-flushing of column 44 directly from opening 18 to the detector opening 20.

If it is desired to interchange columns, this may be accomplished by merely rotating element 12 180°, thus interchanging the relative positions of columns 44 and 56, illustrated in FIG. 1. Two such columns may also be run in series by a 90° rotation of element 12 from the position shown in FIG. 1. A 90° counterclockwise rotation will result in flow from opening 42 through column 44, out of opening 36 into opening 38, through column 46, out of opening 40 and through the detector chamber 24. A 90° clockwise rotation will also result in columns 44 and 46 being placed in series but in reversed order.

FIG. 2 illustrates a similar apparatus, but employing a suitable combustor 56 in combination with column 58. By proper rotation of element 12, placing combustor 56 in series with column 58, but ahead of it, quantitative analysis of hydrocarbons, as explained above, will be obtained. By rotating element 12 so as to place combustor 56 and column 58 in series in reversed order, amplification is obtained.

It will be noted that the apparatus of this invention comprises a compact, convenient means for controlling the flow of carrier and sample through chromatography or vapor fractometer apparatus. While only a few examples have been illustrated and described, many other modifications and variations will be apparent to those skilled in the art. It is intended that all matter contained in the foregoing description or shown in the accompanying drawing shall be interpreted as being illustrative and not in a limiting sense. This invention is limited only by the scope of the following claims.

We claim:
1. Chromatography apparatus comprising
first and second members in abutting, sliding relationship with one another, said first member having at least four openings in its abutting surface and said second member having at least four openings in its abutting surface,
said openings in said first and second member being so positioned relative to each other that upon relative movement of said first and second members to prescribed relative positions various selectible registrations are established between said openings in said first and second members and that at all of said prescribed relative positions all of said openings in said first member are in registration, respectively, with all of said openings in said second member,
an inlet passage connecting with one of said openings in said first member,
an outlet passage connecting with a second of said openings in said first member,
a loop passage interconnecting a third and fourth of said openings in said first member,
at least two chromatographic separating columns mounted on said second member, one of said columns connecting with two openings in said second member and another of said columns connecting with two other openings in said second member,
and means for causing relative movement between said first and second members to said prescribed relative positions to select various registrations between said openings in said first and second members, thereby selecting various flow path relationships between said inlet and outlet passages and said columns.

2. Chromatography apparatus comprising
first and second members in abutting, sliding relationship with one another, said first member having at least four openings in its abutting surface and said second member having at least four openings in its abutting surface;
said openings in said first and second members being so positioned relative to each other that upon relative movement of said first and second members to prescribed relative positions various selectable registrations are established between said openings in said first and second members and that at all of said prescribed relative positions all of said openings in said first member are in registration, respectively, with all of said openings in said second member,
an inlet passage connecting with one of said openings in said first member,
an outlet passage connecting with a second of said openings in said first member,
a chromatographic detector enclosed within said outlet passage,
a loop passage interconnecting a third and fourth of said openings in said first member,
at least two chromatographic separating columns mounted on said second member, one of said columns connecting with two openings in said second member and another of said columns connecting with two other openings in said second member,
and means for causing relative movement between said first and second members to said prescribed relative positions to select various registrations between said openings in said first and second member, thereby selecting various flow path relationships between the said inlet and outlet passages and said columns.

3. Chromatography apparatus comprising
first and second members which are relatively rotatable about a common axis and which are in abutting, sliding relationship with one another, said first member having four openings in its abutting surface and said second member having four openings in its abutting surface,
said openings in said first and second members being so positioned relative to each other that various selectable registrations occur between said openings in said first and second members upon relative rotation of said first and second members about said common axis,
an inlet passage directly connecting with one of said openings in said first member,
an outlet passage directly connecting with a second of said openings in said first member,
a loop passage directly interconnecting a third and fourth of said openings in said first member,
a first chromatographic separating column mounted on said second member and directly connected between said first and second openings in said second member,
a second chromatographic separating column mounted on said second member and directly connected between third and fourth openings in said second matter, and means for causing relative rotation between said first and second members about said common axis to select various registrations between said openings in said first and second members, thereby selecting various flow path relationships between said inlet and outlet passages and said columns.

References Cited by the Examiner

UNITED STATES PATENTS

| | | | |
|---|---|---|---|
| 2,757,541 | 8/56 | Watson et al. | 73—422 |
| 2,841,005 | 7/58 | Coggeshall | 73—23.1 |
| 2,981,092 | 4/61 | Marks | 73—23.1 |
| 2,982,123 | 5/61 | Kindred | 73—23.1 |

FOREIGN PATENTS 860,850   2/61   Great Britain.

RICHARD C. QUEISSER, *Primary Examiner.*

ROBERT L. EVANS, *Examiner.*